V. A. FYNN.
ALTERNATING CURRENT MOTOR.
APPLICATION FILED MAR. 6, 1909.
956,893.
Patented May 3, 1910.
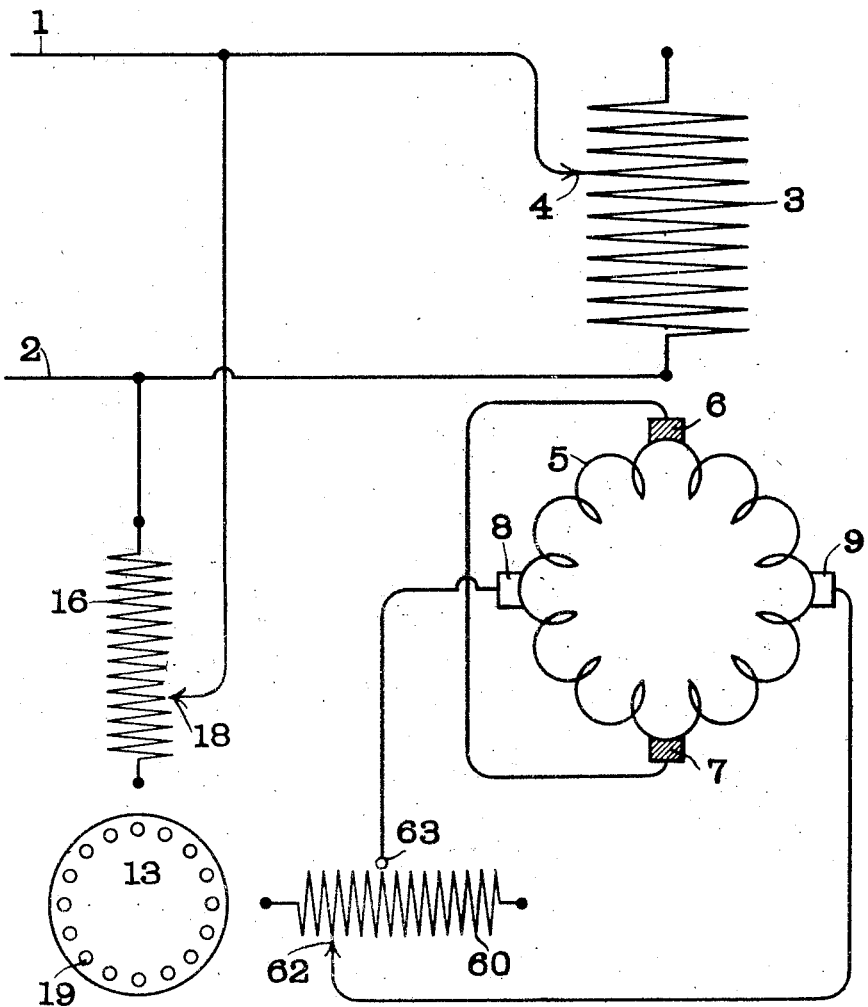
Witnesses
L. L. Mead.
W. H. Alexander.
Inventor
Valère A. Fynn
By his Attorneys
Fowler & Huffman

UNITED STATES PATENT OFFICE.

VALÈRE ALFRED FYNN, OF LONDON, ENGLAND.

ALTERNATING-CURRENT MOTOR.

956,893.     Specification of Letters Patent.     Patented May 3, 1910.

Original application filed December 19, 1906, Serial No. 348,659. Divided and this application filed March 6, 1909. Serial No. 481,762.

*To all whom it may concern:*

Be it known that I, VALÈRE ALFRED FYNN, a subject of the King of England, residing at London, England, have invented a certain new and useful Alternating-Current Motor, of which the following is such a full, clear, and exact description as will enable any one skilled in the art to which it appertains to make and use the same, reference being had to the accompanying drawings, forming part of this specification.

This application is a division of my prior application, Serial No. 348,659, filed December 19, 1906.

My invention relates to alternating current commutator motors of the single-phase induction type the induced and commuted winding of which is closed over brushes and along more than one axis per pole pair.

The objects of this invention are to make it possible to operate such motors from a single-phase supply and at any desired constant speed quite independently of the periodicity of the supply and of the number of poles of the motor, to make it possible to rationally vary or adjust this speed, and to improve their commutation.

According to this invention I adjust the speed of a self-excited alternate current motor of the said type to any desired and practically constant speed differing from the synchronous, or I vary its speed at will by conductively introducing into the exciting circuit a regulating E. M. F. practically in phase quadrature with that impressed on the main inducing winding; this quadrature E. M. F. can be derived from a phase converter. I improve the commutation of this machine by varying the magnitude of the transformer flux due to the main stator inducing winding. The variation of the magnitude of this flux also causes the speed of the motor to vary when the quadrature regulating E. M. F. is not zero. I improve the power factor of this machine in the manner already disclosed by me in my United States Patent No. 777,198; *i. e.* by including in the working circuit of the rotor an E. M. F. approximately in phase quadrature with that impressed on the main stator winding or by including in the exciting circuit of the rotor an E. M. F. approximately in phase with the E. M. F. impressed on the main stator winding.

Referring to the accompanying drawing which diagrammatically illustrates a two-pole motor made in accordance with my invention where the quadrature E. M. F. is derived from a phase converter, 1, 2 are the mains and they are connected to the main stator inducing winding 3; the volts per turn of 3 can be regulated as shown at 4, thus regulating the magnitude of the transformer flux. The induced member is provided with a commuted winding 5 and is short-circuited along the axis of 3 by way of the working brushes 6, 7. It is assumed that only a single phase supply is available, the quadrature regulating E. M. F. included in the exciting circuit is therefore derived from a phase converter 13. Any kind of phase converter can be used, one of the squirrel-cage (19) induction type has been shown for the sake of simplicity. One winding 16 of the phase converter can be regulated at 18 and is connected to the mains 1, 2; the other winding 60 in which an E. M. F. in quadrature with that impressed on 16 or 3 is induced is included in the exciting circuit of the motor to be regulated. The commuted winding 5 here does duty as exciting circuit along an axis preferably displaced by 180/$n$ degrees, where the letter "$n$" stands for the number of poles of the motor, from that of 3. The exciting brushes 8, 9 are therefore connected to 60 which represents the source of the quadrature regulating E. M. F. Because brush 8 is connected to an intermediate point 63 of 60 then 62 not only serves to vary the magnitude but also the direction of the regulating E. M. F. derived from 60.

Having fully described my invention, what I claim as new and desire to secure by Letters Patent of the United States is:

1. In an alternating current motor, the combination with an inducing member provided with a main inducing winding, of an induced member short-circuited along an axis approximately coinciding with that of the main inducing winding, and means for introducing into said induced member along another axis an E. M. F. approximately in phase quadrature to that impressed on the main inducing winding.

2. In an alternating current motor, the combination with an inducing member provided with a main inducing winding, of an induced member provided with a commuted winding short-circuited along an axis approximately coinciding with that of the main inducing winding, and means for introducing into said induced member along another axis an E. M. F. approximately in phase quadrature to that impressed on the main inducing winding.

3. In an alternating current motor, the combination with a stationary member provided with a main inducing winding, of an induced member short-circuited along an axis approximately coinciding with that of the main inducing winding, and a phase converter connected in series relation with the induced member along another axis.

4. In an alternating current motor, the combination with a stationary member provided with a main inducing winding, of an induced member provided with a commuted winding short-circuited along an axis approximately coinciding with that of the main inducing winding, and a phase converter connected in series relation with the induced member along another axis.

5. In an alternating current motor, the combination with an inducing member provided with a main inducing winding, of an induced member short-circuited along an axis approximately coinciding with that of the main inducing winding, means for introducing into said induced member along another axis an E. M. F. approximately in phase quadrature to that impressed on the main inducing winding, and means for varying the volts per turn in said main inducing winding.

In witness whereof I have hereunto set my hand and affixed my seal in the presence of the two subscribing witnesses.

VALÈRE ALFRED FYNN. [L. S.]

Witnesses:
W. A. ALEXANDER,
E. E. HUFFMAN.